(12) United States Patent
Barillas et al.

(10) Patent No.: US 11,182,126 B2
(45) Date of Patent: Nov. 23, 2021

(54) COMPUTATIONALLY EFFICIENT MIXED PRECISION FLOATING POINT WAVEFORM GENERATION

(71) Applicant: Raytheon Company, Waltham, MA (US)

(72) Inventors: Ender Barillas, Orlando, FL (US); Brian Filarsky, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 234 days.

(21) Appl. No.: 16/451,867

(22) Filed: Jun. 25, 2019

(65) Prior Publication Data

US 2020/0409660 A1    Dec. 31, 2020

(51) Int. Cl.
*G06F 7/483* (2006.01)
*G06F 7/57* (2006.01)
*G06F 7/60* (2006.01)
*G06F 9/30* (2018.01)
*G06F 9/38* (2018.01)
*G06F 9/54* (2006.01)

(52) U.S. Cl.
CPC ............ *G06F 7/483* (2013.01); *G06F 7/57* (2013.01); *G06F 7/60* (2013.01); *G06F 9/3001* (2013.01); *G06F 9/3887* (2013.01); *G06F 9/545* (2013.01)

(58) Field of Classification Search
CPC ... G06F 7/483; G06F 7/57; G06F 7/60; G06F 9/3001; G06F 9/3887; G06F 9/545
See application file for complete search history.

(56) References Cited

U.S. PATENT DOCUMENTS

| 5,068,819 A | * | 11/1991 | Misra | ................. G06F 15/8084 708/520 |
| 2013/0007078 A1 | * | 1/2013 | Wegener | ................. G06F 7/483 708/203 |

FOREIGN PATENT DOCUMENTS

WO    WO-2020263359 A1    12/2020

OTHER PUBLICATIONS

"ECE 4680 DSP Laboratory 6: Signal Generation Using DDS", [Online] Retrieved from the internet: <http://www.eas.uccs.edu/~mwickert/ece4680/lecture_notes/Lab6J2016.pdf>, (Jan. 1, 2016), 27 pgs.
"International Application Serial No. PCT/US2020/021731, International Search Report dated Jul. 13, 2020", 4 pgs.
"International Application Serial No. PCT/US2020/021731, Written Opinion dated Jul. 13, 2020", 6 pgs.

(Continued)

*Primary Examiner* — Michael D. Yaary
(74) *Attorney, Agent, or Firm* — Schwegman Lundberg & Woessner, P.A.

(57) ABSTRACT

Computationally efficient mixed precision floating point waveform generation takes advantage of the high-speed generation of waveforms with single-precision floating point numbers while reducing the generally unacceptable loss of precision of pure single-precision floating point to generate any waveform that repeats in $2\pi$. This approaches computes a reference phase in double precision as the modulus of the phase with $2\pi$ and then computes offsets to that value in single precision. The double precision reference phase is recomputed as needed depending on how quickly the phase grows and how large a machine epsilon is desired.

15 Claims, 9 Drawing Sheets

(56) References Cited

OTHER PUBLICATIONS

"Keysight M8195A Arbitrary Waveform Generator User's Guide", [Online] Retrieved from the internet: <https://literature.cdn.keysight.com/litweb/pdf/M8195-91020.pdf>, (Jan. 1, 2015), 128 pgs.
Derek, Nowrouzezahrai, et al., "Efficient Double-Precision Cosine Generation", [Online] Retrieved from the internet: <https://www.iro.umontreal.ca/~derek/files/cosine_report.pdf>, (Jan. 1, 2005).
Ho, C H, et al., "Rapid prototyping of FPGA based floating point DSP systems", Rapid System Prototyping, 2002. Proceedings. 13th IEEE International Workshop on Jul. 1-3, 2002, Piscataway, NJ, USA,IEEE, (Jul. 1, 2002), 19-24.
David Goldberg, "What Every ComputerScientist Should Know About FloatingPoint Arithmetic," published in the Mar. 1991 issue of Computing Surveys. Copyright 1991, Association for Computing Machinery, Inc.

\* cited by examiner

COMPUTATIONALLY EFFICIENT MIXED PRECISION FLOATING POINT WAVEFORM GENERATION

GOVERNMENT LICENSE RIGHTS

This invention was made with government support under W15QKN-15-D-0019-0002 awarded by the United States Army. The government has certain rights in this invention.

BACKGROUND OF THE INVENTION

Field of the Invention

This invention relates to waveform generation using floating point numbers, and more particularly to mixed precision floating-point waveform generation.

Description of the Related Art

In computing, floating-point is the formulaic representation that approximates a real number so as to support a trade-off between range and precision. A number is, in general, represented approximately to a fixed number of significant digits (the significand) and scaled using an exponent; the base for scaling is normally two, ten or sixteen. A floating point unit (FPU) is a math coprocessor as part of a computer system specially designed to carry out operations on floating point numbers such as addition, subtraction, multiplication, division, square root and bitshifting.

Under current convention, single-precision floating-point occupies 4 bytes (32) bits in computer memory and double-precision floating-point occupies 8 bytes (64) bits in computer memory. In theory, the number of bits can be allocated to the sign bit, significand and exponent in any manner. However, the IEEE 754 definition is by far the most prevalent, and defines single and double precision floating point numbers with the following where the sign bit is for the full number, the actual exponent is biased by $(2^{(n-1)}-1)$:

| Type | Sign Bit | Significand bits (p) | Exponent bits | Exponent Bias | Exponent Range |
|---|---|---|---|---|---|
| Binary32 (Single Precision) | 1 | 24 | 8 | 1023 | −1022:1023 |
| Binary64 (Double Precision) | 1 | 53 | 11 | 16383 | −16382:16383 |

For any floating point representation of a number, the smallest difference between any two numbers is known as the machine epsilon. The machine epsilon is dependent on the base of the number system, the magnitude of the value, and the size of the significand. The machine epsilon of a base-2 floating point number ($\varepsilon$) of value n with significand size p is:

$$\varepsilon = \frac{2^{\lfloor \log_2 n \rfloor}}{2^{p-1}} \quad (1)$$

While the significand is fixed for a given type, the magnitude of the value is not, so the machine epsilon can change. Every time you double a number, the machine epsilon doubles. This is true for both single and double precision. However, with double precision numbers this error can often be neglected. For instance, when dealing with the radius of Earth (6,378,000 m), the machine epsilon of a double precision number is about one nanometer, whereas the machine epsilon of a single precision number is half a meter.

As applied to waveform generation and processing, the floating point representation of the number that approximates the real value of the waveform must consider and balance both the accuracy of the waveform representation and subsequent processing versus the computational load of generating the waveform and performing subsequent calculations. In many applications single-precision floating point is simply not precise enough so one must bear the computational burden of double-precision floating point.

As shown in FIGS. 1a-1b, in an exemplary embodiment of waveform generation, which in this case is a simple sinusoid, all of the calculations may be performed with an N-bit floating point unit (FPU) 100 and arithmetic logic unit (ALU) 102 in a processor 104 driven by a clocking signal 106. For example, the N-bit FPU might be a 32-bit single-precision unit or a 64-bit double-precisions unit. To generate sample values of a given sinusoidal waveform 108, the floating point unit 100 computes a phase $$\theta = 2 * \pi * f_c \left( \frac{n}{f_s} \right)$$

(step 150) for an initial sample number n=0 where $f_c$ is the signal frequency and $f_s$ is the sampling frequency, computes a sample value $S=A*\cos(\theta)$ or $S=A*e^{i\theta}$ where A is a constant (step 152) of sinusoidal waveform 108, increments the sample number n=n+1 (step 154) and repeats for the specified number of samples N. All subsequent calculations are performed with N-bit precision. The same approach applies to the generation of any waveform such as Amplitude Modulation (AM), Single-Sideband Modulation (SSB), Frequency Modulation (FM), Pulse Modulation (PM), and Quadrature Amplitude Modulation (QAM).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method and apparatus for computationally efficient mixed precision floating point waveform generation. The approach takes advantage of the high-speed generation of waveforms with single-precision floating point numbers while reducing the generally unacceptable loss of precision of pure single-precision floating point. The approach can be used to generate any waveform that repeats in $2\pi$.

Rather than computing the phase solely in single precision and allowing the phase to grow unbounded, this approaches computes a reference phase in double precision as the modulus of the phase with $2\pi$ and then computes offsets to that value in single precision. The double precision reference phase is recomputed as needed depending on how quickly the phase grows and how large a machine epsilon is acceptable. This may allow for a single cycle in double precision for thousands of cycles in single precision to generate the waveform. This approach allows for taking advantage of the majority of that speedup without the unacceptably growing bound on machine epsilon. In addition, subsequent processing of the waveform may be performed with single-precision FPUs greatly reducing the computational burden.

In an embodiment, for each sample number n and a reference sample number r, a single-precision floating point unit (FPU) is used to compute a single-precision phase as an offset from a single-precision reference phase by a phase kernel indexed by the reference sample number r and then to compute a single-precision value for a waveform that repeats in $2\pi$ as a function of the single-precision phase for the current sample number n. The sample number n and the reference sample number r are incremented. If the reference sample number r does not meet a threshold, control returns to the single-precision FPU to compute the single-precision phase for the next sample number n. If the threshold is met, a double-precision FPU is used to compute a double-precision reference phase as a modulus of $2\pi$ of the phase kernel indexed by the sample number n and convert the double-precision reference phase to single-precision to update the single-precision reference phase. The reference sample number r is reset to zero and control is returned to the single-precision FPU to compute the single-precision phase for the next sample number n.

More generally, in other embodiments an L-bit FPU may be used to compute the phase and waveform values and an M-bit FPU, where M>L, may be used to compute the reference phase.

These and other features and advantages of the invention will be apparent to those skilled in the art from the following detailed description of preferred embodiments, taken together with the accompanying drawings, in which:

DETAILED DESCRIPTION OF THE INVENTION

The problem with known approaches for waveform generation is that the linear phase grows unbounded for waveforms that repeat in $2\pi$. Every time the phase value doubles, the machine epsilon doubles. In many applications, with single-precision floating point the machine epsilon is unacceptably large. Although the machine epsilon continues to grow with phase for double-precision, the number of bits allocated to the significand, 53 as compared to 24 for single-precision, keeps the machine epsilon acceptably small for almost all applications. However, the system must bear the burden of generating the waveform with double-precision and performing all subsequent processing with double-precision.

Computationally efficient mixed precision floating point waveform generation takes advantage of the high-speed generation of waveforms with single-precision floating point numbers while reducing the generally unacceptable loss of precision of pure single-precision floating point to generate any waveform that repeats in $2\pi$. This approaches computes a reference phase in double precision as the modulus of the phase with $2\pi$ and then computes offsets to that value in single precision. The double precision reference phase is recomputed as needed depending on how quickly the phase grows and how large a machine epsilon is desired. The waveform value is represented with single-precision. Thus, all downstream process can be performed with single-precision resulting in considerable computational savings. This approach can be generalized to use an L-bit FPU to compute the phase and waveform values and an M-bit FPU, where M>L, to compute the reference phase.

Without loss of generality the mixed-precision approach for waveform generation will be described using the IEEE standard definitions of single and double-precision. This mixed-precision technique is valid for any waveform that repeats in $2\pi$, which includes any sinusoidal signal. Therefore, any waveform that repeats in $2\pi$ may be represented as one or more sinusoidal signals to represent, for example, continuous wave (CW), Amplitude Modulation (AM), Single-Sideband Modulation (SSB), Frequency Modulation (FM), Pulse Modulation (PM), and Quadrature Amplitude Modulation (QAM). Any signal of interest may be represented using the mixed-precision technique. For simplicity, the exemplary embodiment generates a single sinusoid.

Figure 2A:
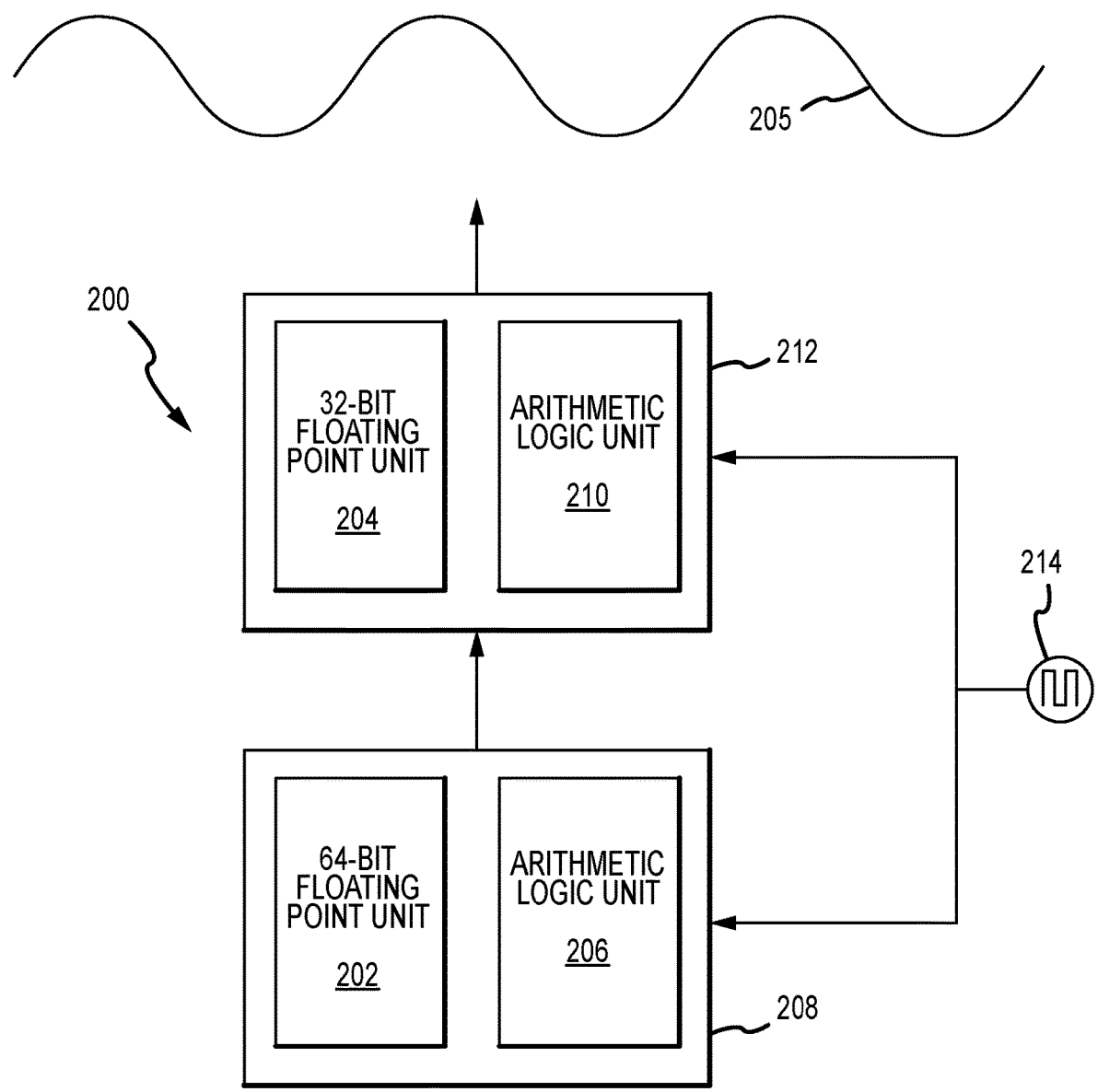
FIGS. 2a and 2b illustrate the use of a mix of single-precision and double-precision floating point units to generate single-precision values of a waveform that repeats in $2\pi$.
Figure 2B:
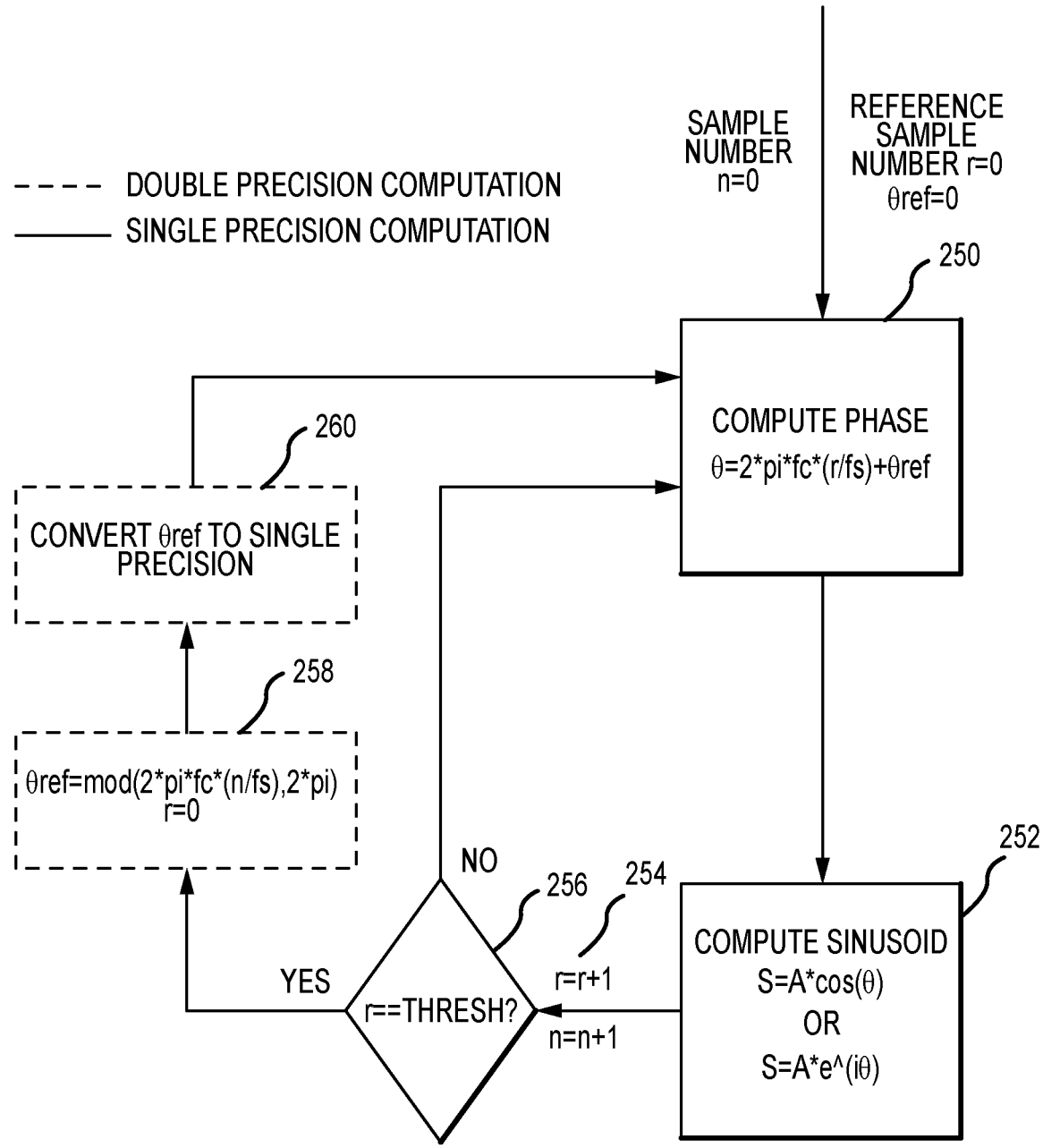

As shown in FIGS. 2a-2b, a mixed-precision waveform generator 200 uses a combination of single-precision and double-precision floating-point units 202 and 204, respectively, to generate the samples of the waveform 205 with a single-precision floating-point representation. In this example, the double-precision floating point unit 202 and an ALU 206 are part of a processor 208 and the single-precision floating point units 204 and an ALU 210 are part of another processor 212. Note, a single processor may support both the single and double-precision FPUs or a single FPU can function as either a 64 or 32 bit FPU. Both processors are driven by a clocking signal 214. All subsequent calculations are then computed in single-precision floating point. The use of double-precision floating point to calculate a reference phase for generating the samples of the transmitter signals establishes an initial higher level of accuracy. The resulting waveform values are more accurate than they would otherwise be using single-precision throughout. Computations are saved both in the initial generation of the waveform and in the subsequent processing of single-precision floating point numbers.

For each sample number n and a reference sample number r and initial $\theta ref=0$, the single-precision floating point unit 204 computes a single-precision phase $$\theta = 2*\pi*f_c\left(\frac{r}{fs}\right)+\theta ref$$

(step 250) as an offset of a phase kernel $$2*\pi*f_c\left(\frac{r}{fs}\right)$$

indexed by the reference sample number r from a single-precision reference phase θref where $f_c$ is the signal frequency and $f_s$ is the sampling frequency and then computes the waveform value 205 S=A*cos(B) or S=A*$e^{i\theta}$ (step 252) based on that phase. An arithmetic logic unit (ALU) increments the sample number n and the reference sample number r (step 254) and if the reference sample number does not meet a threshold (step 256) returns control to the single-precision floating point unit 204 to compute a next phase (step 250). If the threshold is met, the double-precision floating point unit 202 updates the reference phase $$\theta ref = \mod\left(2*\pi*f_c\left(\frac{n}{fs}\right),\ 2\pi\right)$$

(step 258) by computing the phase kernel indexed by the incremented sample number n and taking the modulus with 2π. The ALU resets the reference sample number r=0 and FPU 204 casts the double-precision reference phase to single-precision (step 260) and returns control to the single-precision floating point unit 204 to compute the phase for the next sample number (step 250). The threshold is determined by a maximum machine epsilon to keep the phase value bounded.

Figure 1A:
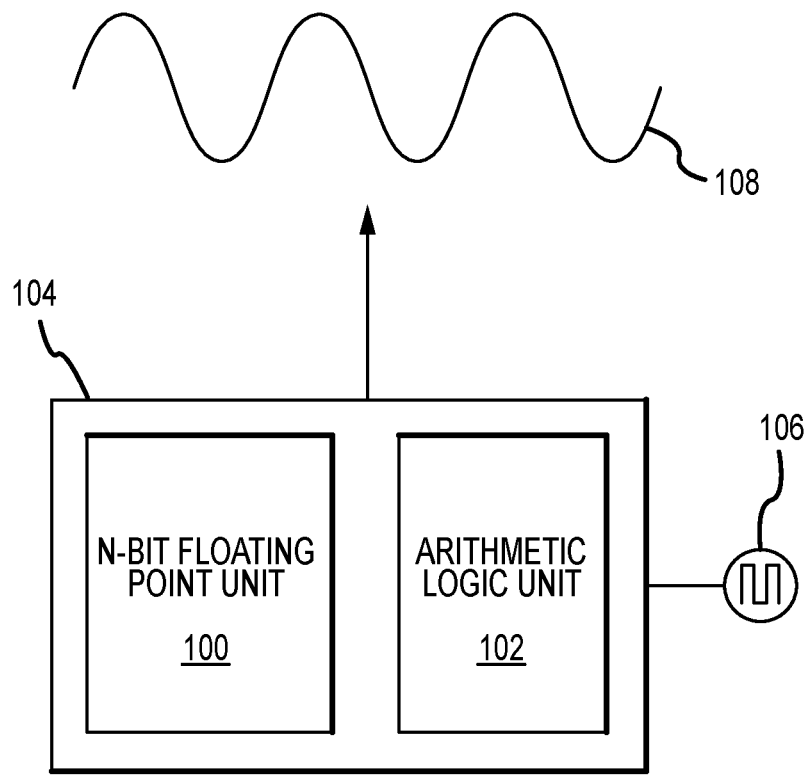
FIGS. 1a and 1b, as described above, illustrate the use of N-bit floating point units to generate a sinusoidal waveform.
Figure 1B:
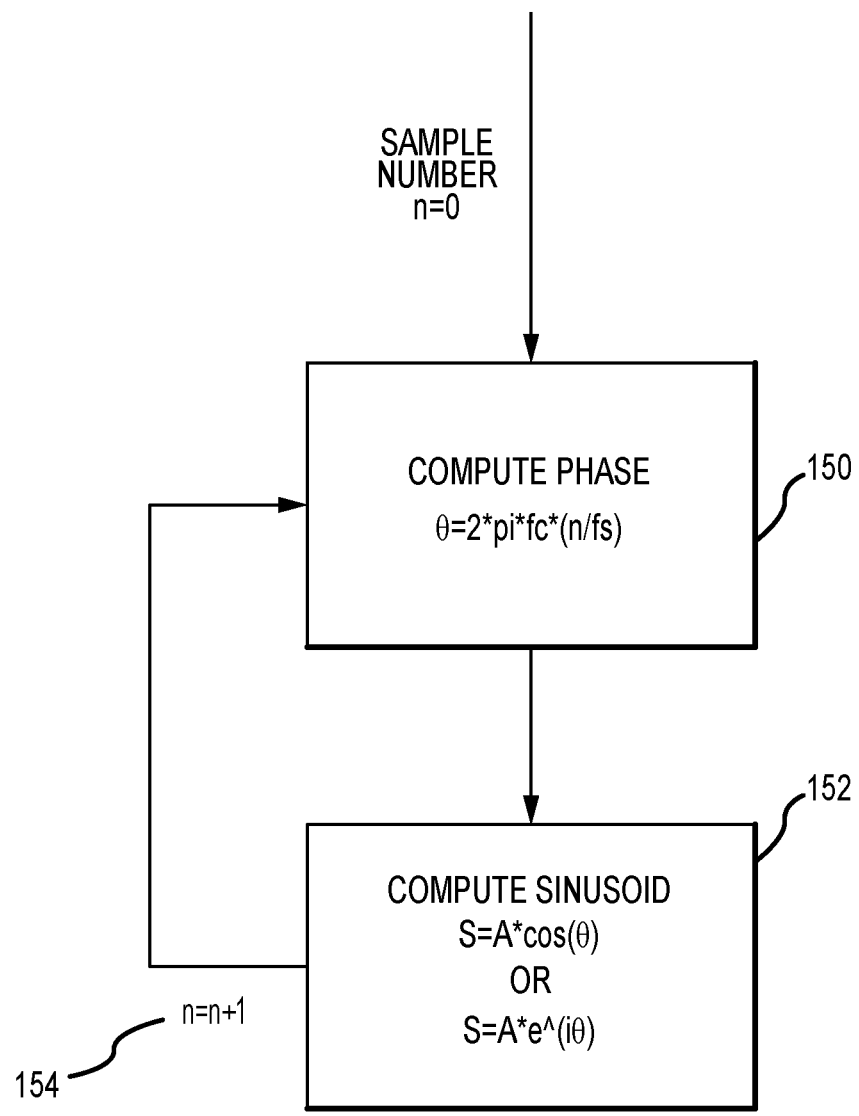

It is worth noting that if FPUs of equal precision were employed to perform all of the calculations of FIG. 2b, the flow diagram degenerates to that shown in FIG. 1b. It is the combination of using different precision FPUs with the methodology depicted in FIG. 2b; high precision FPU to compute the reference phase and low precision FPU to compute the offset that achieves the improvement in accuracy and computational efficiency. It is critical that the calculation of the reference phase is performed with greater precision than the computation of the phase and waveform values. Computational efficiency for waveform generation is achieved by the fact that the inner loop of computing the single-precision phase is performed far more often than the outer loop of computing the double-precision reference phase.

Figure 3:
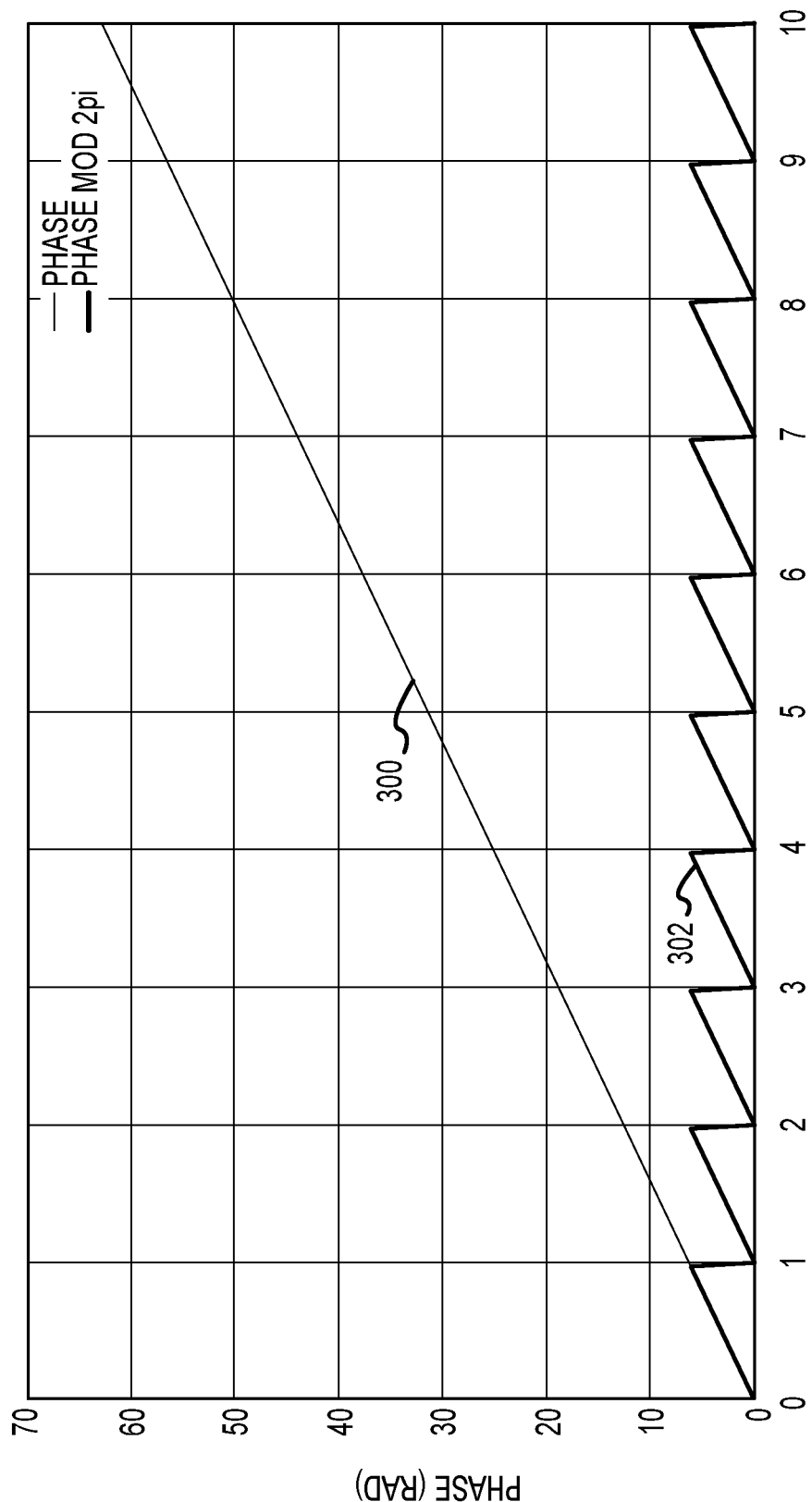
FIG. 3 is a plot of a linear phase for a waveform and the linear phase modulus $2\pi$.
Figure 4:
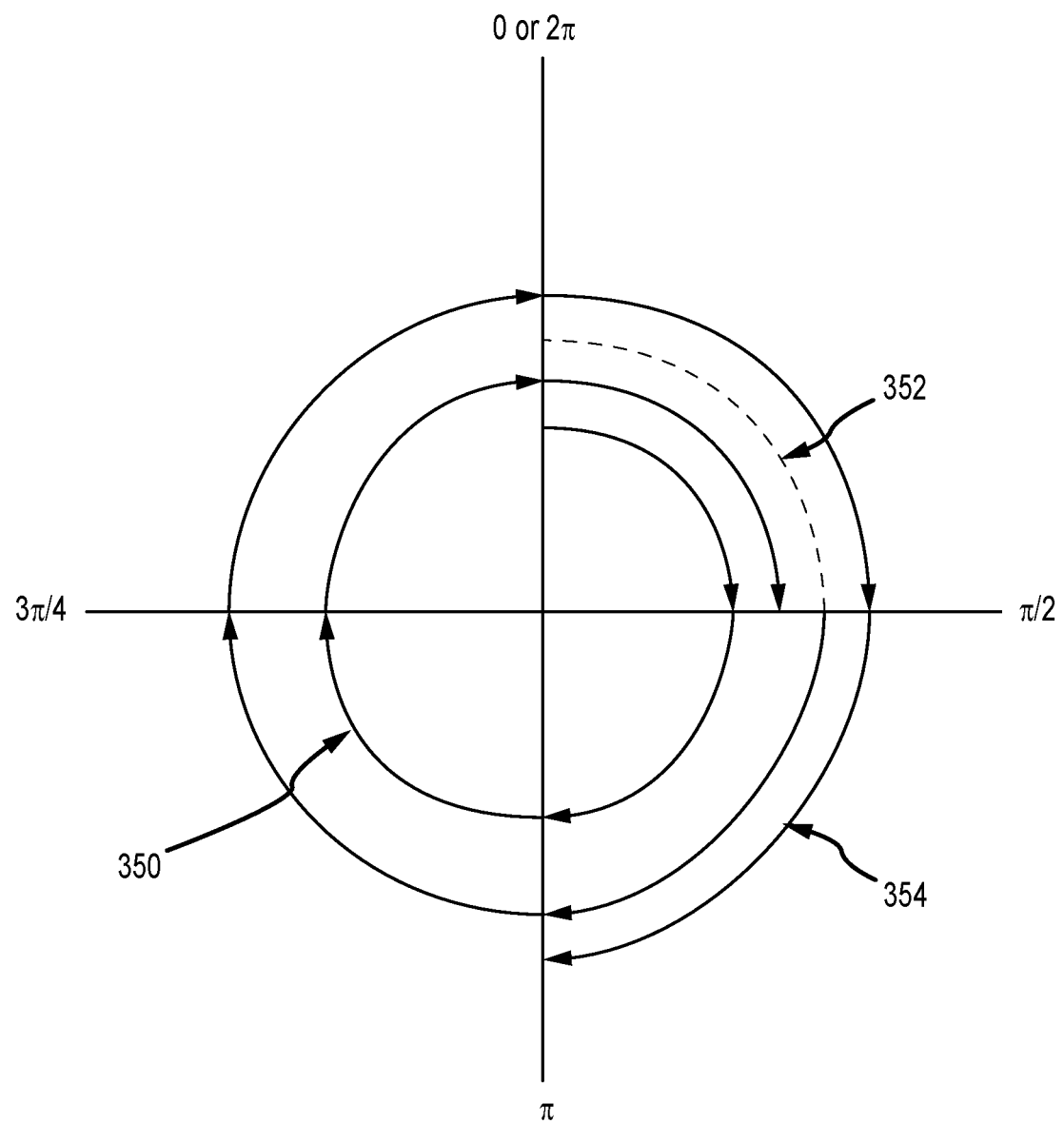
FIG. 4 is a diagram plots illustrating the computation of waveform values computing the reference phase modulus $2\pi$ plus the offset.

The approach of computing a reference phase in double precision as the modulus of the phase with 2π and then computing offsets to that value in single precision until the reference phase needs to be updated is illustrated in FIGS. 3 and 4. As shown in FIG. 3, a linear phase 300 of a waveform that repeats in 2π increases with time without bound. The linear phase modulus 2π provides a reference phase 302 that is bounded by 0 and 2π. Therefore the range, hence machine epsilon of the phase is bounded. When this is coupled with a double-precision floating point computation of the reference phase 302 the machine epsilon of the phase remains small, approximately that of a pure double-precision floating point calculation.

In an exemplary calculation, as shown in FIG. 4, the threshold is set to 5. The single-precision FPU calculates the phase and waveform value for the first five samples based on an initial reference phase of zero as depicted by inner loop 350. The double-precision FPU than calculates the reference phase 352. The single-precision FPU calculates the phase and waveform value for the next five samples as offsets from the reference phase 352 as depicted by outer loop 354 and the process repeats.

As previously described, for any floating point representation of a number, the smallest difference between any two numbers is known as the machine epsilon. The machine epsilon is dependent on the base of the number system, the magnitude of the value, and the size of the significand. The machine epsilon of a base-2 floating point number (ε) of value n with significand size p is $$\varepsilon = \frac{2^{\lfloor log_2 n \rfloor}}{2^{p-1}}.$$

Solving for a desired machine epsilon $\varepsilon_{max}$ with precision p, the upper limit for phase value is $\theta_{max}=2^{\lceil log_2 2^{p-1}\varepsilon_{max}\rceil}$. Assuming that the starting phase of the signal is <2π, and θ increments by no more than π at every iteration (keeping at or below Nyquist frequency), the maximum threshold for updating the single precision reference phase is:

$$r_{max} = \frac{2^{\lceil log_2(2^{p-1}\varepsilon_{max})\rceil}-2\pi}{\pi} \quad (2)$$

Figure 5:
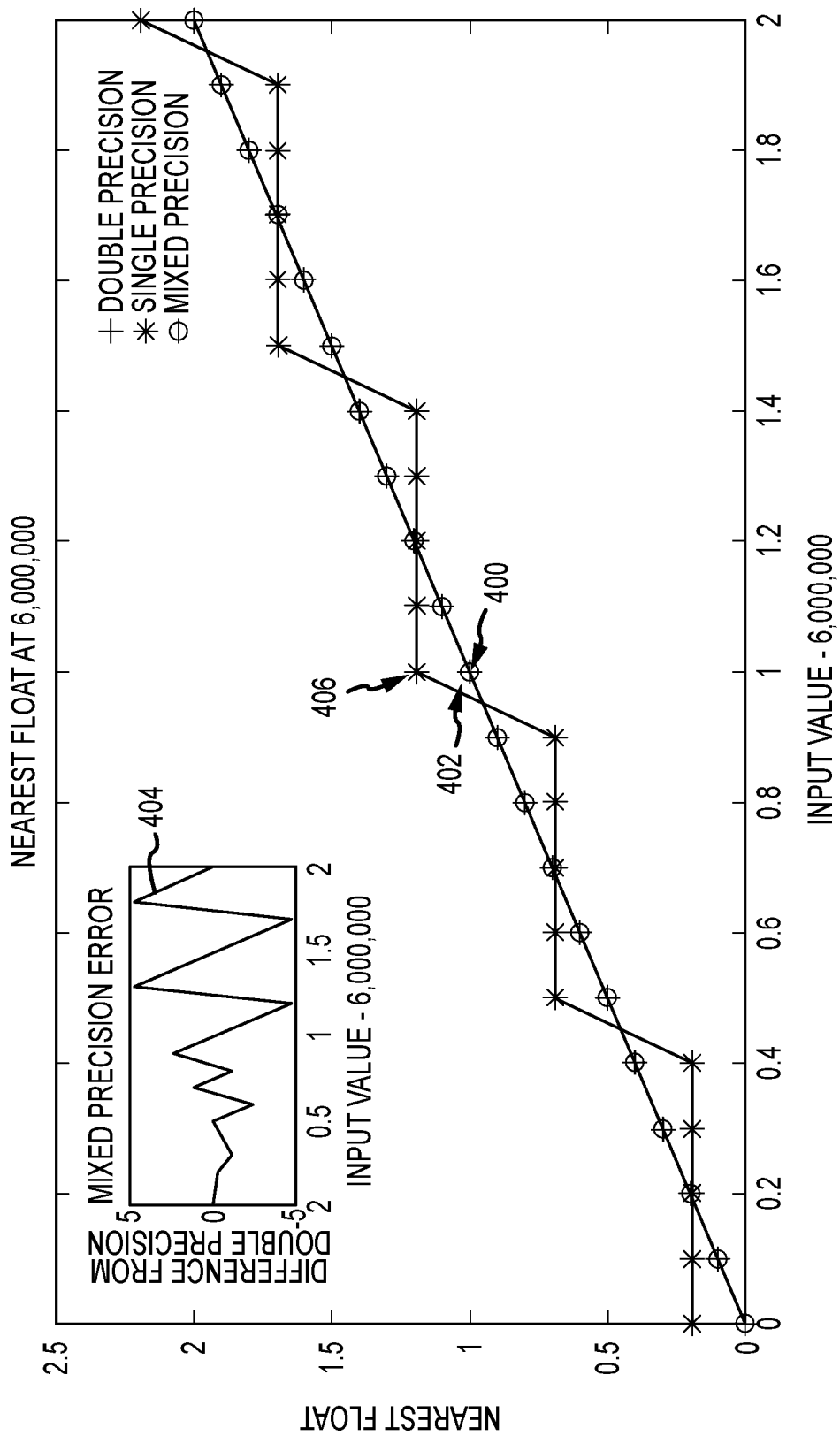
FIG. 5 is an exemplary plot and a highly zoomed portion of that plot of machine epsilon for conventional single-precision and double precision floating point and mixed-precision floating point in accordance with the present invention.

The enhanced accuracy of mixed precision floating point waveform generation is illustrated in comparison to straight single-precision and double precision in FIG. 5. In this example, the input value (or range) is set at 6,000,000 and the machine epsilon is calculated for that value. A double-precision floating point representation 400 closely approximates the real number for the phase value and the mixed-precision floating point representation 402 is virtually indistinguishable. The machine epsilon for both is very small. As shown in the inset to FIG. 5b, the error 404 of the mixed-precision value from the double-precision value is extremely small. By contrast, the single-precision floating point representation 406 is a coarse stair-case approximate to the real phase value because the machine epsilon is relatively large. The near double-precision accuracy of the mixed-precision calculation of the phase carries over to an improved accuracy of the waveform values.

Figure 6:
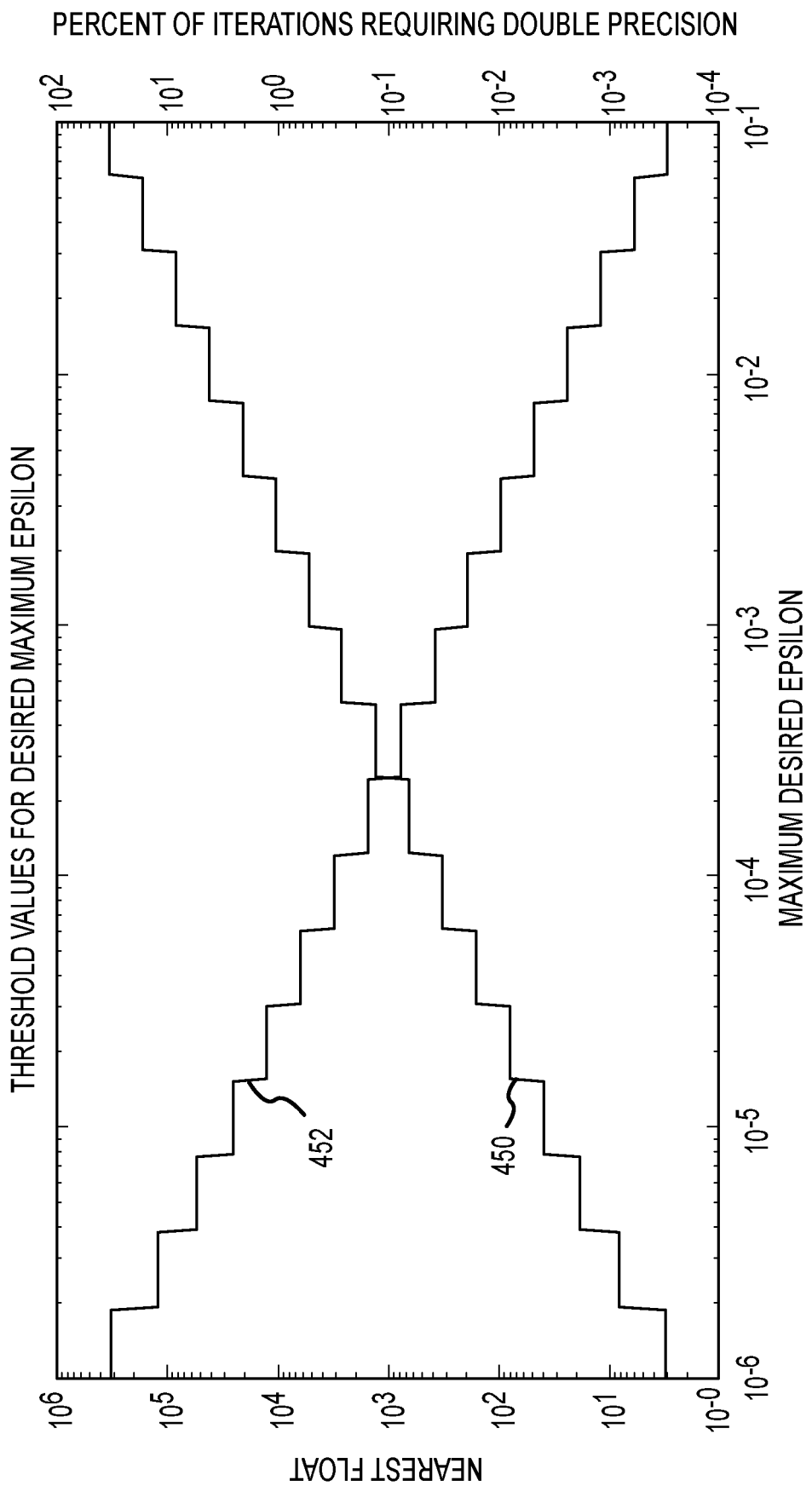
FIG. 6 is a plot of threshold values and computational efficiency versus maximum machine epsilon.

As shown in FIG. 6, the threshold value $r_{max}$ 450 follows an increasing stair-case function with increasing maximum machine epsilon $\varepsilon_{max}$. The larger the allowable maximum machine epsilon the greater the number of single-precision calculations of the offset phase that can be made before the double-precision reference phase must be updated. The computational efficiency 452 as measured by the percent of iterations requiring double-precision is inversely proportional to the maximum machine epsilon and the threshold. As the threshold increases, computational efficiency improves. For a given application, a system designer must trade the desire for mixed-precision representation that approximates double-precision performance against a computational efficiency that approximates single-precision performance. The benefit of the mixed-precision approach is that it can achieve most of the performance benefits of double-precision and most of the computational efficiency benefits of single-precision in waveform generation. For example, in some cases the threshold value may be at least 1,000. The percentage of double-precisions calculations is very small yet the accuracy closely approximates double-precision.

Figure 7:
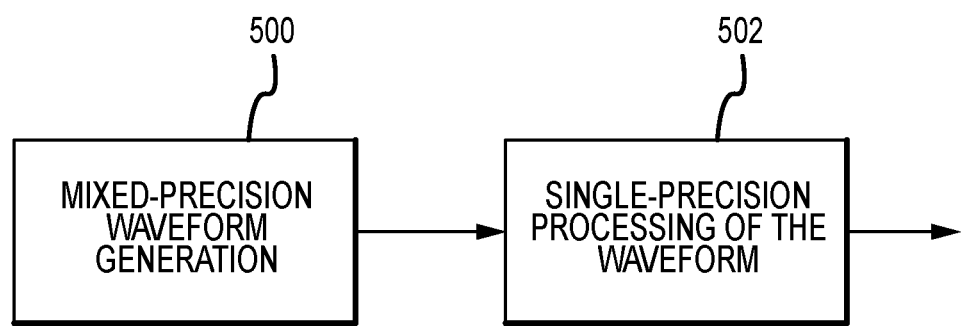
FIG. 7 is a block diagram for mixed-precision waveform generation.

As shown in FIG. 7, most systems and applications include both the generation of a waveform in a floating point representation (step 500) and subsequent downstream processing of that waveform in its native floating point representation (step 502). In addition to the initial benefits in improved accuracy and computational efficiency to generate the waveform, a major benefit of the mixed-precision floating point computation are the improved accuracy that propagates down stream and the reduction in the computational burden. Accuracy is improved because the waveform itself approximates the double-precision floating point representation. Computational efficiency is improved because all subsequent processing is performing using single precision floating point rather than double precision.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of generating a waveform, comprising:
for each sample number n and a reference sample number r,
using a single-precision floating point unit (FPU) math coprocessor to compute a single-precision phase as an offset from a single-precision reference phase by a phase kernel indexed by the reference sample number r;
using the single-precision FPU math coprocessor to compute a single-precision value for a waveform that repeats in $2\pi$ as a function of the single-precision phase for the current sample number n;
incrementing the sample number n and the reference sample number r;
if the reference sample number r does not meet a threshold, returning control to the single-precision FPU math coprocessor to compute the single-precision phase for the next sample number n; and
if the threshold is met, using a double-precision FPU math coprocessor to compute a double-precision reference phase as a modulus of $2\pi$ of the phase kernel indexed by the sample number n, converting the double-precision reference phase to single-precision to update the single-precision reference phase and resetting the reference sample number r, and returning control to the single-precision FPU math coprocessor to compute the single-precision phase for the next sample number n.

2. The method of claim 1, wherein the phase kernel indexed by the reference sample number $$\theta = 2 * \pi * f_c \left( \frac{r}{fs} \right),$$

the phase kernel indexed by the sample n is $$\theta = 2 * \pi * f_c \left( \frac{n}{fs} \right),$$

and the waveform is a sinusoid.

3. The method of claim 1, wherein the threshold is set to ensure that a machine epsilon of the single-precision phase value does not exceed a specified maximum.

4. The method of claim 3, wherein the threshold $$r_{max} = \frac{2^{\lceil log_2(2^{p-1}\varepsilon_{max}) \rceil} - 2\pi}{\pi}$$

where $\varepsilon_{max}$, is the specified machine epsilon maximum for the single-precision phase value and p is the number of bits in the significand of the single precision phase value.

5. The method of claim 1, wherein the threshold is at least 1,000.

6. The method of claim 1, wherein all subsequent processing of the waveform is performed with single-precision floating point.

7. An apparatus for generating a waveform, comprising:
a single-precision floating point unit (FPU) math coprocessor to compute a single-precision phase based as an offset from a single-precision reference phase by a phase kernel indexed by a reference sample number r and compute single-precision values for a waveform that repeats in $2\pi$ as a function of the single-precision phase for a sample number n;
an arithmetic logic unit (ALU) configured to increment the sample number n and the reference sample number r and determine whether the reference sample number r meets a threshold, if not the ALU returns control to the single-precision FPU math coprocessor to compute the next phase and waveform value; and
a double-precision FPU math coprocessor to compute a double-precision reference phase as a modulus of $2\pi$ of the phase kernel indexed by the sample number n and convert the double-precision reference phase to single-precision to update the single-precision reference phase, said ALU configured to reset the reference sample number r, and return control to the single-precision FPU math coprocessor to compute the next phase and waveform value.

8. The apparatus of claim 7, wherein the phase kernel indexed by the reference sample number r is $$\theta = 2 * \pi * f_c \left( \frac{r}{fs} \right),$$

the phase kernel indexed by the sample number n is $$\theta = 2 * \pi * f_c \left( \frac{n}{fs} \right),$$

and the waveform is a sinusoid.

9. The apparatus of claim 7, wherein the threshold is set to ensure that a machine epsilon of the single-precision phase value does not exceed a specified maximum.

10. The apparatus of claim 9, wherein the threshold $$r_{max} = \frac{2^{\lceil log_2(2^{p-1}\varepsilon_{max}) \rceil} - 2\pi}{\pi}$$

where $\varepsilon_{max}$ is the specified machine epsilon maximum for the single-precision phase value and p is the number of bits in the significand of the single precision phase value.

11. The apparatus of claim 7, wherein the threshold is at least 1,000.

12. The apparatus of claim 7, further comprising an additional single-precision FPU math coprocessor that performs all subsequent processing of the waveform in single-precision floating point.

13. A method of generating a waveform, comprising:
   for each sample number n and a reference sample number r,
      using an L-bit floating point unit (FPU) math coprocessor to compute an L-bit phase as an offset from an L-bit reference phase by a phase kernel indexed by the reference sample number r;
      using the an L-bit FPU math coprocessor to compute an L-bit value for a waveform that repeats in 2π as a function of the L-bit phase for the current sample number n;
      incrementing the sample number n and the reference sample number r;
      if the reference sample number r does not meet a threshold, returning control to the L-bit FPU math coprocessor to compute the L-bit phase for the next sample number n; and
      if the threshold is met, using an M-bit FPU math coprocessor, where M>L, to compute an M-bit reference phase as a modulus of 2π of the phase kernel indexed by the sample number n, converting the M-bit reference phase to L-bits to update the L-bit reference phase and resetting the reference sample number r, and returning control to the L-bit FPU math coprocessor to compute the L-bit phase for the next sample number n.

14. The method of claim 13, wherein the threshold is set to ensure that a machine epsilon of the L-bit phase value does not exceed a specified maximum.

15. The method of claim 13, wherein M is at least twice L.

* * * * *

UNITED STATES PATENT AND TRADEMARK OFFICE
CERTIFICATE OF CORRECTION

PATENT NO. : 11,182,126 B2
APPLICATION NO. : 16/451867
DATED : November 23, 2021
INVENTOR(S) : Barillas et al.

Page 1 of 1

It is certified that error appears in the above-identified patent and that said Letters Patent is hereby corrected as shown below:

On the Title Page

On page 2, in Column 1, item (56) under "Other Publications", Line 11, delete "ComputerScientist" and insert --Computer Scientist-- therefor On page 2, in Column 1, item (56) under "Other Publications", Line 12, delete "FloatingPoint" and insert --Floating-Point-- therefor In the Specification In Column 5, Line 10, delete "S=A*cos(B)" and insert --S = A * cos($\theta$)-- therefor In Column 6, Line 18, delete " $\theta_{max} = 2^{\lceil log_2 2^{p-1} \varepsilon_{max} \rceil}$ " and insert -- $\theta_{max} = 2^{\lceil log_2 (2^{p-1} \varepsilon_{max}) \rceil}$ -- therefor In the Claims In Column 7, Line 54, in Claim 2, after "number", insert --r is--

In Column 7, Line 60, in Claim 2, after "sample", insert --number--

In Column 8, Line 11, in Claim 4, delete "$\varepsilon_{max}$," and insert --$\varepsilon_{max}$-- therefor In Column 9, Line 1, in Claim 10, delete "$\varepsilon_{max}$is" and insert --$\varepsilon_{max}$ is-- therefor In Column 9, Line 17, in Claim 13, delete "the an" and insert --the-- therefor Signed and Sealed this
Twenty-second Day of February, 2022

Drew Hirshfeld
*Performing the Functions and Duties of the
Under Secretary of Commerce for Intellectual Property and
Director of the United States Patent and Trademark Office*